United States Patent [19]
Friesen et al.

[11] 3,789,914
[45] Feb. 5, 1974

[54] FOUNDRY MOLD JACKET AND WEIGHT SHIFTER

[75] Inventors: Wilmer J. Friesen; Frank A. Hulet, both of Hutchinson, Kans.

[73] Assignee: M. W. Hartmann Manufacturing Co., Inc., Hutchinson, Kans.

[22] Filed: Apr. 24, 1972

[21] Appl. No.: 246,904

Related U.S. Application Data

[62] Division of Ser. No. 101,363, Dec. 24, 1970, Pat. No. 3,731,822.

[52] U.S. Cl. ............................................. 164/339
[51] Int. Cl. ........................................... B22d 33/04
[58] Field of Search ... 164/323, 324, 325, 327, 328, 164/330, 339, 341, 395, 396, 401, 394, 404

[56] References Cited
UNITED STATES PATENTS

| | | | |
|---|---|---|---|
| 3,199,157 | 8/1965 | Fellows | 164/404 |
| 2,575,103 | 11/1951 | Gavin | 164/394 X |
| 2,985,926 | 5/1961 | Fellows | 164/323 X |
| 3,039,157 | 6/1962 | Bobenmyer | 164/339 |
| 3,068,537 | 12/1962 | Fellows | 164/168 |
| 3,339,626 | 9/1967 | Buhrer | 164/339 |
| 3,397,737 | 8/1968 | Tuttle | 164/327 |
| 3,068,537 | 12/1962 | Fellows | 164/168 |

Primary Examiner—J. Spencer Overholser
Assistant Examiner—John S. Brown
Attorney, Agent, or Firm—Miner L. Hartmann

[57] ABSTRACT

The shifting of the jackets and weights from the molds on one conveyor system run to a contiguous conveyor system run is performed automatically by a swinging boom mechanism having a vertical lift mechanism on the outer end of the boom. An open clamp means attached to the lower end of the lift rod closes the clamp on the jacket and accompanying weight of a mold in which the molten metal has solidified. The closed clamp and its load is lifted clear of the mold, swung on the supporting post through an angle to an aligned position over a fresh mold approaching the metal pouring station, after which the jacket and weight, held in the clamp assembly, is lowered over the green mold, set or snugged down on the mold, and the clamp is then opened, raised, swung back over the first conveyor run, and the cycle repeated. The operation is synchronous with the step-by-step movement of the mold pallets on the conveyor.

4 Claims, 8 Drawing Figures

FOUNDRY MOLD JACKET AND WEIGHT SHIFTER

This is a divisional application of my application Ser. No. 101,363 filed Dec. 24, 1970, now U.S. Pat. No. 3,731,822, issued May 8, 1973.

BACKGROUND AND SUMMARY OF THE INVENTION.

Foundries having automated conveyor systems which intermittently advance a series of sand molds from a mold making station, to a jacketing and weighting station, to a metal pouring station, through a cooling section, to a jacket and weight removal station, and through other operating stations until the casting is finally removed from the disintegrated mold, have the problem of removing the jacket and weight from each partly cooled mold with its solidified casting, and applying the jacket and weight to a green sand mold approaching the pouring station. Where the conveyor system is so arranged that the molds in certain parallel sections or runs are moving in opposite directions, with the jacket removal station being adjacent the new mold section, the desired transfer of jackets and weights is desirably made automatic and synchronous with the step-by-step movement of the conveyor system. A foundry conveyor system of the kind desired is described in pending patent application Ser. No. 863,433 and now U.S. Pat. No. 3,514,832 filed Oct. 3, 1969, by inventors Frank A. Hulet and Wilmer J. Friesen.

It is conventional to produce green sand molds in two superimposed parts, (cope and drag), and before the molten metal is poured, a tapered jacket is provided to protect and hold the parts together, and a weight is usually placed on top to prevent the displacement of the mold parts when the metal is poured. After the metal has solidified, the jacket and weight are removed to facilitate the cooling of the casting.

The principal object of the invention is to provide an automatic jacket and weight shifter for use with a foundry mold pallet conveyor system which moves a series of molds on pallets in step-by-step movement through the several operations from mold forming to separation of the solidified casting from the mold residue. Another object is to provide a jacket and weight shifter of the kind described which is fully automatic in a sequence of movements which shifts the jackets and weights from a mold having a partly cooled solidified casting therein to a new bare green sand mold which is about to reach the metal pouring station.

A further object is to provide an automatic jacket shifter which picks up an empty jacket, carries it to a position over a bare sand mold, and places the jacket on the mold preparatory to the pouring of molten metal therein.

Another object is to provide means for setting the jacket down snugly or tightly on the mold after it is placed on the mold preparatory to the pouring of molten metal into the mold.

Another object is to provide means for controlling a boom device of the type indicated which maintains the compass orientation of an attached clamp means at the two ends of the limited angular movements of said boom.

These and other objects are attained by our invention which is further described below, reference being made to the accompanying drawings showing a preferred embodiment.

DESCRIPTION OF THE PREFERRED EMBODIMENT.

Figure 1:
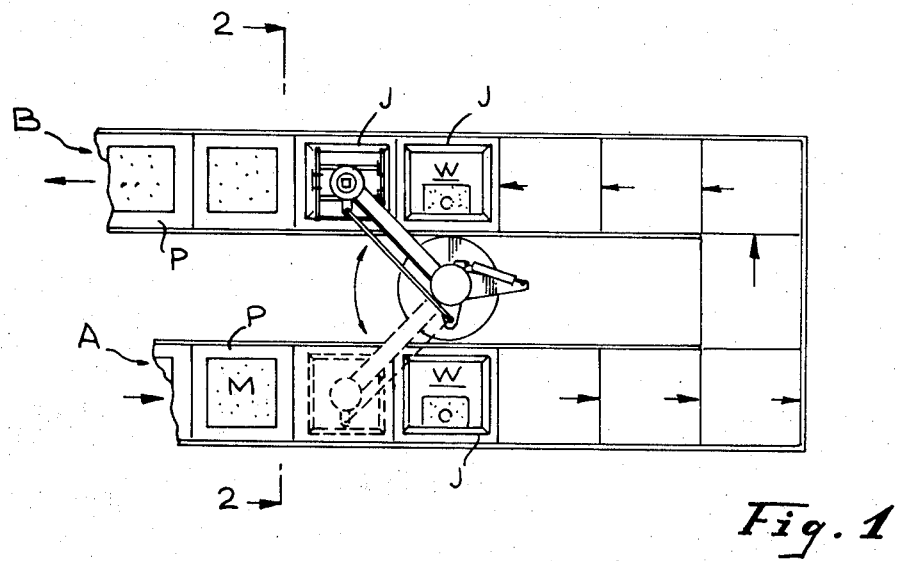
FIG. 1 is a top plan view showing the shifter disposed between adjoining runs of a mold conveyor system.
Figure 2:
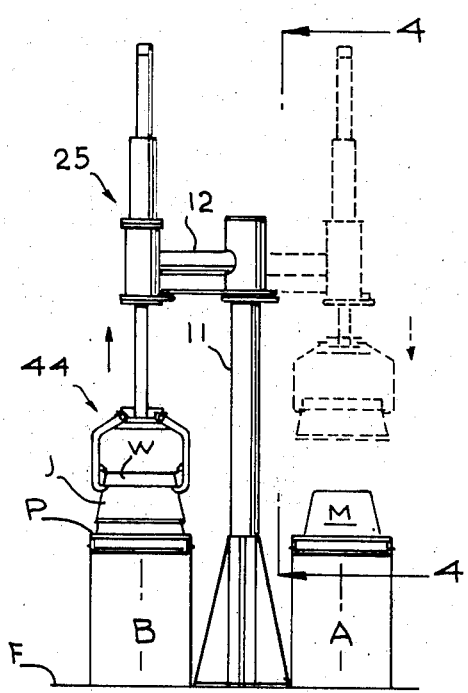
FIG. 2 is an elevational view taken from the position 2—2 of FIG. 1 and showing boom alternatively over the two runs of the conveyor system.
Figure 6:
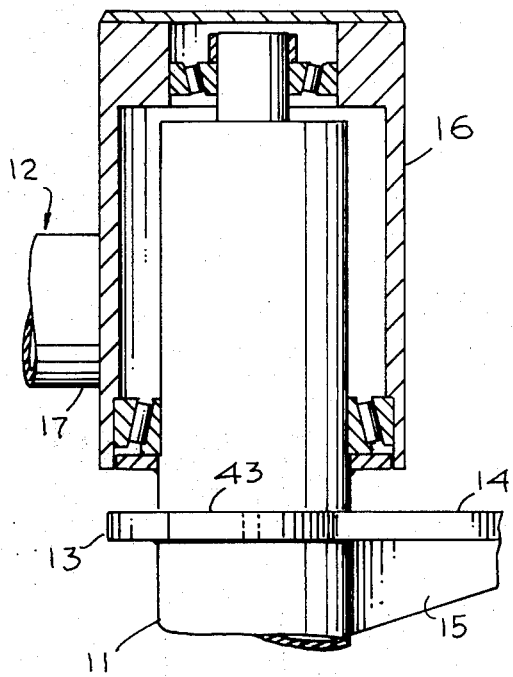
FIG. 6 is a fragmentary elevational view taken from the position 6—6 of FIG. 5, showing the pivotal support for boom.
Figure 8:
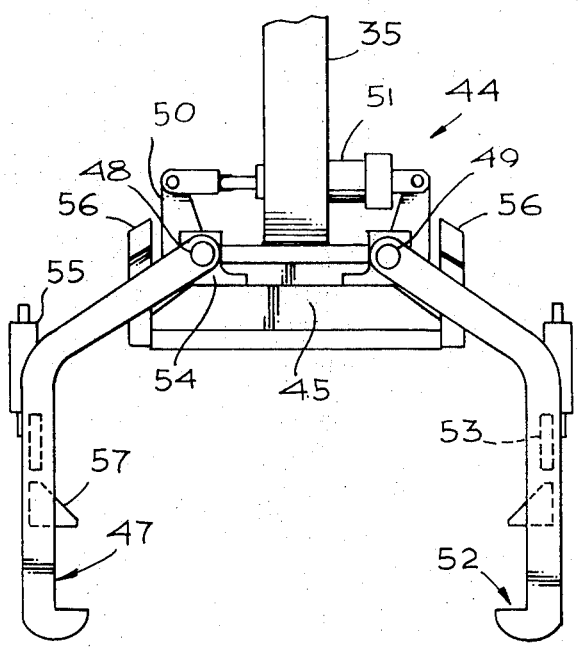
FIG. 8 is an end elevational view of the lifter clamp, in closed position.
Figure 7:
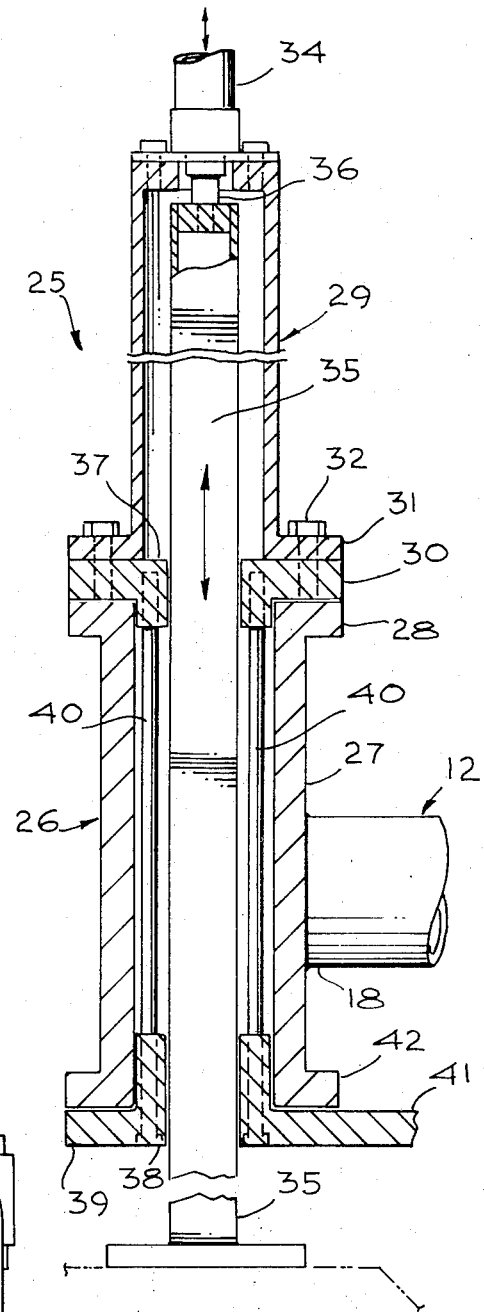
FIG. 7 is a fragmentary elevational view taken from the position 7—7 of FIG. 4, showing clamp lift assembly.

Referring to the drawings (which for clarity omit electrical wiring and hydraulic piping to the several operating cylinder assemblies), an upright support post 11 is anchored to the floor F between adjacent parallel conveyor sections A and B of pallets P carrying sand molds M, some of which have a jacket J and a weight W, and others being without jackets and weights (as represented particularly in FIGS. 1 and 2). A swinging boom 12 is rotatably mounted on the upper end of the vertical support post 11. The length of the boom 12 and the position of the support post are selected so that by angular movement of the boom, the outer boom end may be alternatively disposed over the longitudinal center lines of conveyors A and B. A collar 13 having a cylinder mounting arm 14 reinforced by a gusset 15 extending generally opposite the position of the boom 12, is provided near the top of the vertical support post 11. On the top end portion of the support post 11 is mounted a rotatable bearing assembly 16 (see FIG. 6) attached to the near end 17 of the boom 12, supporting it and the attachments at the outer boom end 18, as will be described.

An attachment lug 20 extends from the mounting arm 14 to which one end 22 of the boom-rotating cylinder 21 is operatively attached, the other end 23 of said boom-rotating cylinder 21 being pivotally attached to the outer end of said arm 14.

At the outer end of the boom 12 is attached the lift assembly 25 which consists of a lower body portion 26 which is rigidly attached by its side wall 27 at an intermediate longitudinal position to the outer end 18 of the swinging boom 12. An outwardly extending flange 28 is provided at the top of lower body portion 26, upon which rests the upper pivot bearing housing 29, which housing is attached by bolts 32 to the outwardly extending flange 31 on the lower end of the upper housing portion 29 so that the two body portions 26 and 29 of the lift assembly 25 are relatively movable, axially.

A hydraulic lift cylinder 34 is operatively mounted on the top of the upper body portion 29, the piston rod 36 of said cylinder being attached to a non-rotatable lift rod 35. The lift rod 35 extends through guide 37 integral with the upper pivot bearing 30, and also through a lower guide 38, integral with lower pivot bearing 39, these guides preventing rotation of the lift rod. The pivot bearing 39 is attached within the lower body portion 26 by tie bolts 40 engaging the upper pivot bearing 29, these tie bolts being disposed in the space between the side walls of the lower body portion 26 and the lift rod 35. An outer bearing flange 42 extends from the lower end of body portion 26.

An outwardly extending lug 41 on the lower pivot bearing 39 is provided to connect with one end of the tie rod 40, the other end of the tie rod being attached to an outwardly extending lug 43 integral with the collar 13 of the support post 11. The clamp assembly is attached to the lower end of the lift rod 35 and the tie rod 42 maintains the orientation of the clamp assembly 44 relative to the center line of both conveyor runs A and B when the boom is swung from one position to another.

The clamp assembly 44 consists of a rectangular frame member 45 to the center of which is affixed the lower end of the lift rod 35. Two pairs of C-shaped hooks 46 and 47 are rotatably mounted at the ends of each of two shafts 48 and 49 extended across the frame member 45. One hook 46 of each pair is provided with an upwardly extending operating arm 50, these lever arms being connected together by means of a clamp-operating hydraulic cylinder 51. The shafts 48 and 49 are mounted in pillow blocks 54 attached to the top of the frame member 45. Each of the hooks is provided with an inwardly directed notch 52 shaped to engage under the upper flange of the jackets J which cover the mold M. The hooks 46 and 47 of each pair are connected together by the brace members 53 disposed centrally intermediate the ends of said hooks.

A vibrator device 55 is attached to the brace member 53 intermediate its ends.

Stop members 56 are provided on the frame 45 near the pivoted end of hooks 47 to limit the open positions of each pair of hooks. Lugs 57 are provided on hooks 46 and 47 to set or snug down jacket 5 covering the mold.

Figure 5:
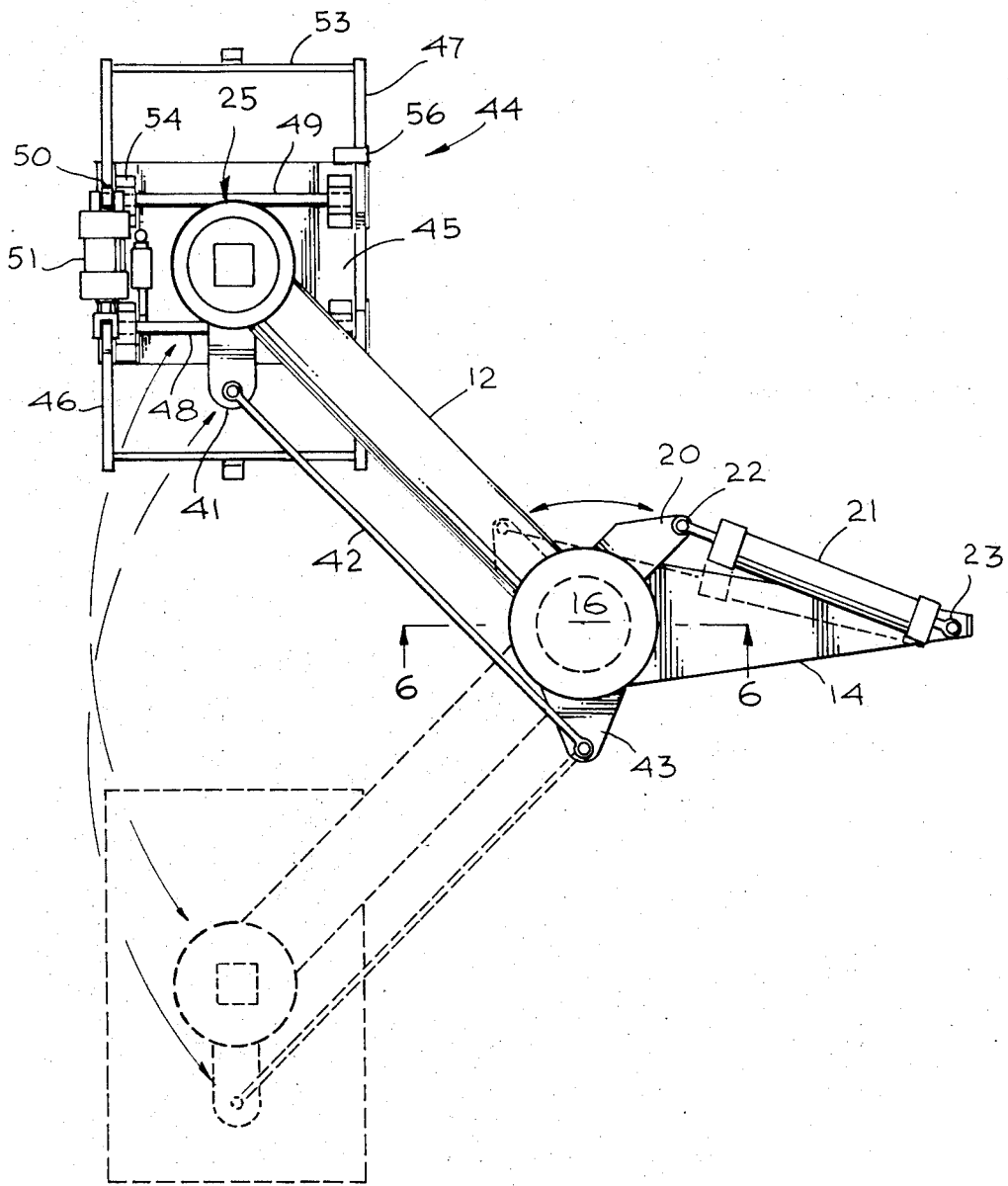
FIG. 5 is a top plan view of the shifter and the clamp assembly (in open position), including the path and two operative positions.

The manner of operation of the several parts of the shifter will be clear from the above descriptions of the structures. The rotation of the swinging boom 12 on the supporting post 11 is effected by the movement of the piston in the cylinder 21, moving (as indicated in FIG. 5) from the upper position to the lower position in the drawing when the piston rod pushes on the lug 20, and reversing the swing by the opposite piston movement. The up and down movement of the lift rod and attached clamp assembly results from the related movement of the piston in and out of the cylinder 34. The opening and closing of the clamps of the clamp assembly, in grasping and releasing the jacket and weight on the mold, results from the movement of the piston in the hydraulic clamp cylinder 51.

Figure 3:
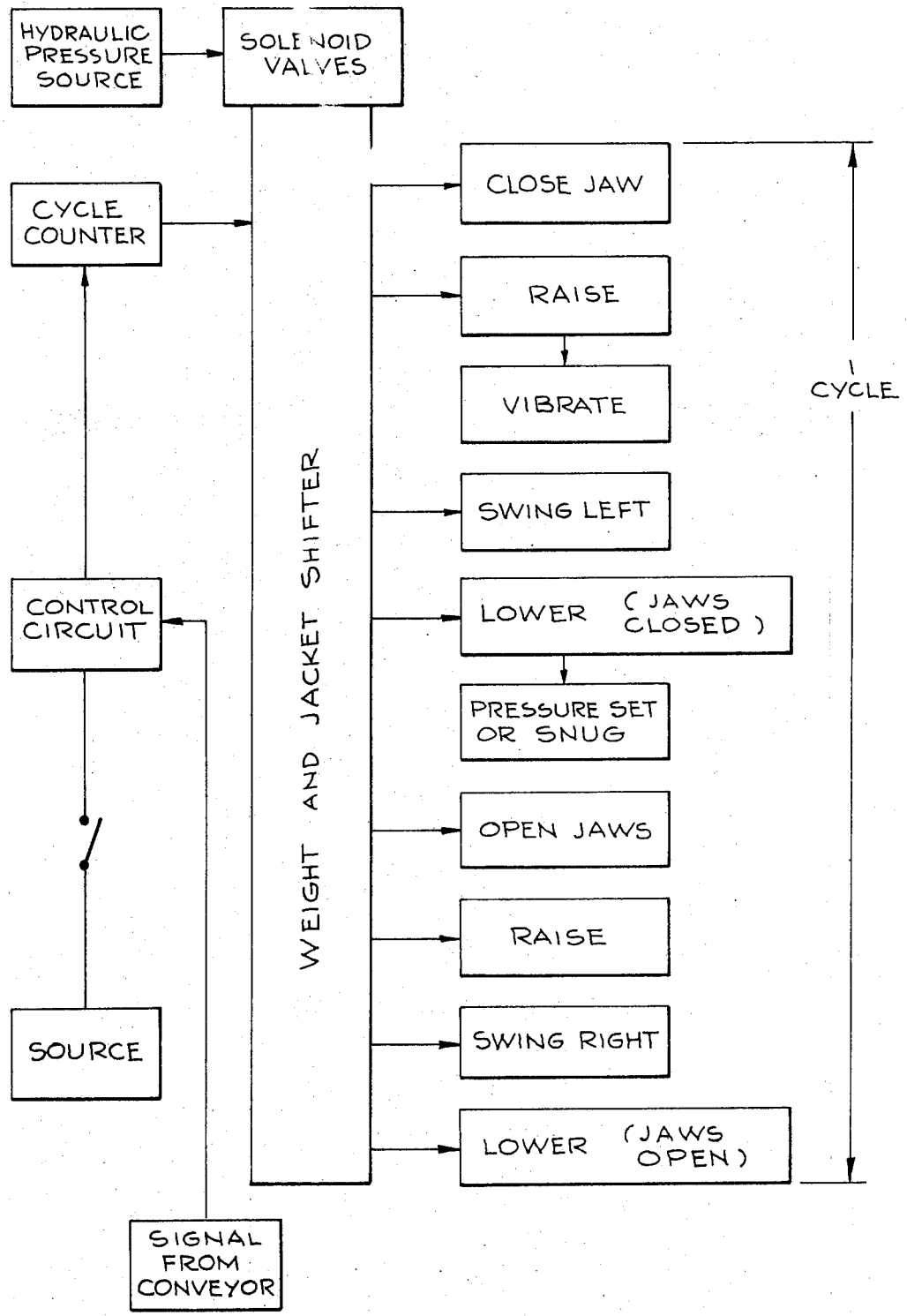
FIG. 3 is a diagrammatic representation of the automatic valve controls for the operating parts of the shifter device.
Figure 4:
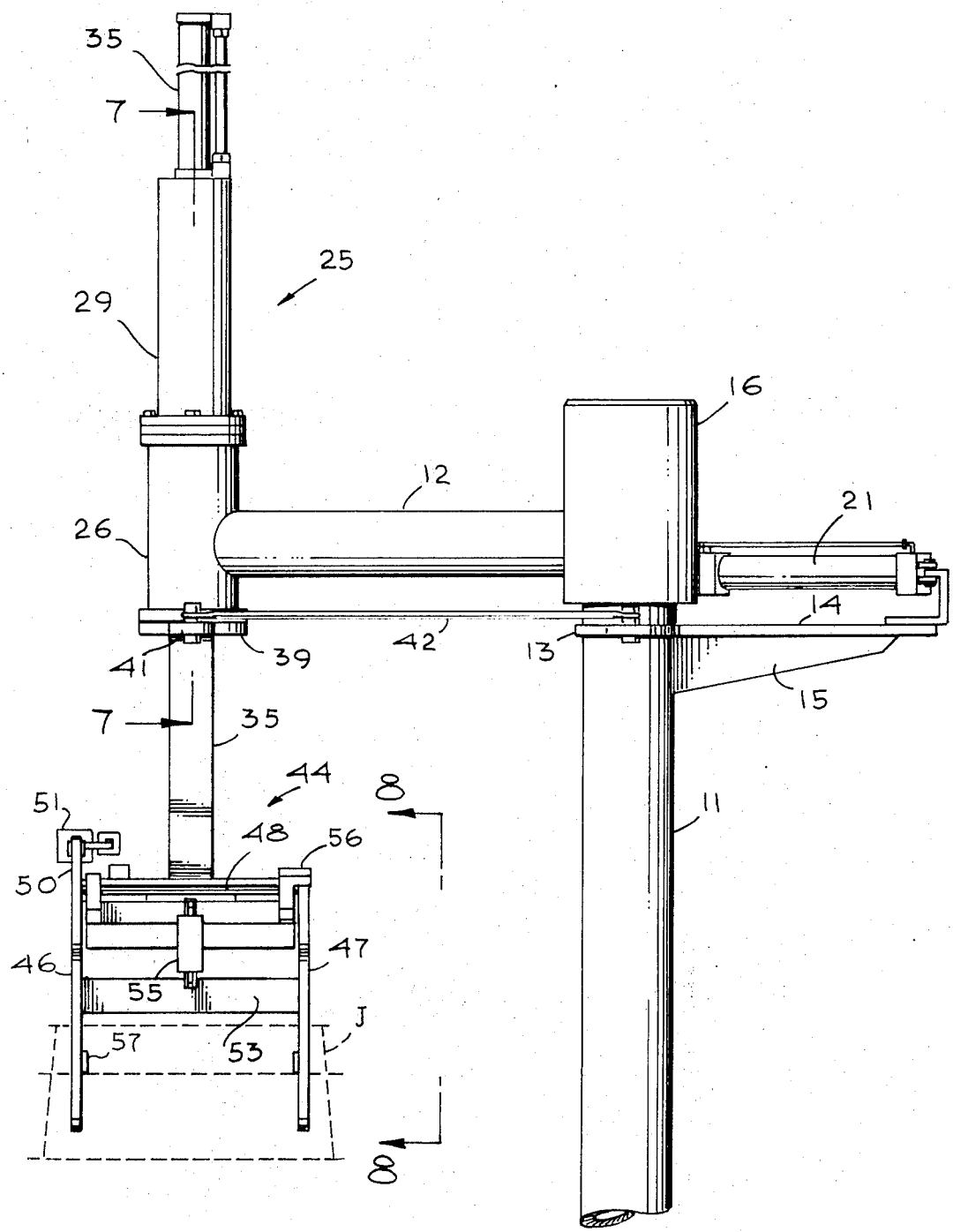
FIG. 4 is an elevational view of the shifter taken from the position 4—4 of FIG. 2.

A diagrammatical showing of the sequence of motions of the several parts of the shifter device are shown in FIG. 3. Each hydraulic operating cylinder is provided with solenoid valves which start, stop, reverse and stop the flow of hydraulic fluid to the respective cylinders in the operating sequence as shown on the diagram. The operation of the shifter is synchronized with the step-by-step advancement of the mold bearing pallets of the conveyor system.

Where the word "jacket" is used in the accompanying claims it is intended to include not only the enclosing metal frame but also when employed any weighting members which are commonly associated in the trade with the use of jackets to hold the sand mold together during the pouring of the molten metal.

We claim:

1. In the art of manipulating foundry flaskless green sand molds on a horizontal conveyor during a metal casting operation before and after the molten metal is poured, the combination comprising a step-by-step foundry mold conveyor system having adjacent conveyor runs, each run of said conveyor system comprising an elongated supporting frame having a succession of spaced apart rollers extending across the top of said frame adapted to carry a plurality of abutting rectangular pallets along said frame, including means for moving said train of pallets intermittently through the length of one pallet;

a mold jacket shifter disposed adjacent said conveyor runs, said shifter comprising a rigid support means, a swinging boom pivotally mounted at the upper end of said support means including means for moving said boom back and forth through a limited angular horizontal path, the boom having on its outer end a depending lift rod with associated means for raising and lowering said lift rod, a jacket clamp attached to the lower end of said rod, including means for closing and opening said clamp, and means operatively associated with said vertical lift rod and said rigid support means for maintaining the compass orientation of said clamp at the two ends of the limited angular path of said boom; and means for synchronizing the movements of said shifter with the movement of said conveyor.

2. The combination claimed in claim 1, in which the conveyor runs move in opposite directions.

3. In the art of manipulating foundry flaskless green sand molds on a horizontal conveyor during a metal casting operation before and after the molten metal is poured, the combination comprising a step-by-step foundry mold conveyor system having adjacent conveyor runs moving in opposite directions, each run of said conveyor system comprising an elongated supporting frame having a succession of spaced apart rollers extending across the top of said frame adapted to carry a plurality of abutting rectangular pallets along said frame, including means for moving said train of pallets intermittently through the length of one pallet;

a jacket shifter comprising a support post rigidly mounted between said adjacent conveyor runs, a swinging boom pivotally mounted at one end for angular horizontal movement, at the top of said support post, a lift assembly for a depending clamp means attached on the outer end of said swinging boom, a mold jacket clamp means including closing and opening means attached to the lower end of said lift assembly, whereby to shift a jacket from a mold on a cooling section of said conveyor system to a fresh mold on an adjacent section of said conveyor system leading to the metal pouring station, and means associated with said lift assembly and said support post for maintaining the compass orientation of said clamp means at the ends of the limited angular path of said swinging boom; and means for synchronizing the movements of said jacket shifter with the step-by-step movement of said conveyor system.

4. In the art of manipulating foundry flaskless green sand molds on a horizontal conveyor during a metal casting operation before and after the molten metal is poured, the combination comprising a step-by-step foundry mold conveyor system having adjacent conveyor runs moving in opposite directions, each run of said conveyor system comprising an elongated supporting frame having a succession of spaced apart rollers extending across the top of said frame adapted to carry a plurality of abutting rectangular pallets along said frame, including means for moving said train of pallets intermittently through the length of one pallet;

a mold jacket shifter disposed adjacent said conveyor runs comprising a firmly mounted vertical post;

a swinging boom pivotally mounted on the top portion of said post, said boom having a hydraulic piston and cylinder assembly operatively connected between a lever arm extending horizontally from said post and a horizontally disposed lug extending laterally from said boom, with a hydraulic lift assembly attached to said boom at its outer end including a depending lift bar to the lower end of which is attached a C-hook jacket clamp assembly including hydraulic closing and opening means for said C-hook adapted to engage or release a mold jacket; and means for synchronizing the sequential movements of said jacket shifter with the step-by-step movement of said conveyor system.

* * * * *